(12) United States Patent
Rhein (10) Patent No.: US 10,418,765 B2
(45) Date of Patent: Sep. 17, 2019

(54) MULTI-WIRE PLANAR CABLE FOR A MONITORING SYSTEM OF A BATTERY MODULE

(71) Applicant: TE CONNECTIVITY CORPORATION, Berwyn, PA (US)

(72) Inventor: David James Rhein, Memphis, MI (US)

(73) Assignee: TE CONNECTIVITY, Berwyn, PA (US)

( * ) Notice: Subject to any disclaimer, the term of this patent is extended or adjusted under 35 U.S.C. 154(b) by 266 days.

(21) Appl. No.: 15/406,864

(22) Filed: Jan. 16, 2017

(65) Prior Publication Data

US 2018/0205192 A1    Jul. 19, 2018

(51) Int. Cl.
| | |
|---|---|
| *H01M 2/20* | (2006.01) |
| *H01R 25/16* | (2006.01) |
| *H01M 2/10* | (2006.01) |
| *H01M 10/48* | (2006.01) |
| *H01R 12/77* | (2011.01) |
| *H01M 10/42* | (2006.01) |
| *H01R 12/61* | (2011.01) |
| *H01R 12/65* | (2011.01) |

(52) U.S. Cl.
CPC ........ *H01R 25/162* (2013.01); *H01M 2/1077* (2013.01); *H01M 2/206* (2013.01); *H01M 10/425* (2013.01); *H01M 10/4207* (2013.01); *H01M 10/482* (2013.01); *H01R 12/616* (2013.01); *H01R 12/65* (2013.01); *H01R 12/778* (2013.01); *H01M 2220/20* (2013.01)

(58) Field of Classification Search
None
See application file for complete search history.

(56) References Cited

U.S. PATENT DOCUMENTS

| | | |
|---|---|---|
| 6,057,511 A | 5/2000 | Ikeda et al. |
| 2014/0000961 A1 | 1/2014 | Uehara et al. |
| 2016/0172651 A1 | 6/2016 | Ichikawa et al. |

FOREIGN PATENT DOCUMENTS

| | | |
|---|---|---|
| EP | 1253684 A2 | 10/2002 |
| WO | 2016077266 A1 | 5/2016 |
| WO | 2016209466 A1 | 12/2016 |
| WO | 2016209678 A1 | 12/2016 |
| WO | 2017163187 A1 | 9/2017 |
| WO | 2018011690 A1 | 1/2018 |

OTHER PUBLICATIONS

International Search Report, International Application No. PCT/IB2018/050176, International Filing Date Jan. 11, 2018.

*Primary Examiner* — Tracy M Dove (57) ABSTRACT

A connector assembly for voltage monitoring of bus bars electrically connecting adjacent battery cells of a battery module includes a connector having a plurality of terminals configured to be mated with a control module connector associated with the battery module. A multi-wire planar cable extends from the connector. The multi-wire planar cable has a plurality of wires terminated to corresponding terminals and a common jacket for the plurality of wires. The jacket has grooves between adjacent wires for controlled separation of the wires and surrounding jacket portions at a sensor end of the multi-wire planar cable to define separated planar cable segments. The separated planar cable segments are routed to different areas for termination to different voltage sensors associated with corresponding bus bars.

20 Claims, 8 Drawing Sheets

MULTI-WIRE PLANAR CABLE FOR A MONITORING SYSTEM OF A BATTERY MODULE

BACKGROUND OF THE INVENTION

The subject matter herein relates generally to battery connector systems.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. The positive and negative cell terminals are connected using bus bars. Some systems are designed to monitor aspects of the battery cells, such as voltage, temperature and the like. Such systems provide sensors that are connected to a monitoring circuit. Round wires are typically connected to the sensors as parts of wire harnesses that interconnect the sensors and the monitoring circuit. Providing the round wires between each of the cells or bus bars and the monitoring unit adds bulk to the battery modules, particularly where the wires a stacked up and routed through the system. The wire harnesses are at risk for damage to the wires. Some systems use flexible printed circuits to reduce the thickness of the wires connecting to the bus bars. However flexible printed circuits are expensive and redesign or re-routing of the circuits can be expensive.

A need remains for battery modules that use low cost, flexible flat cables for termination of wires to components of the battery monitoring system.

BRIEF DESCRIPTION OF THE INVENTION

In one embodiment, a connector assembly is provided for voltage monitoring of bus bars electrically connecting adjacent battery cells of a battery module. The connector assembly includes a connector having a plurality of terminals configured to be mated with a control module connector associated with the battery module. The connector assembly includes a multi-wire planar cable extending from the connector. The multi-wire planar cable has a plurality of wires terminated to corresponding terminals and a common jacket for the plurality of wires. The jacket has grooves between adjacent wires for controlled separation of the wires and surrounding jacket portions at a sensor end of the multi-wire planar cable to define separated planar cable segments. The separated planar cable segments are routed to different areas for termination to different voltage sensors associated with corresponding bus bars.

In a further embodiment, a carrier assembly for battery cells of a battery module is provided including a tray configured to be coupled to a top of the battery module over the battery cells. The tray holds a plurality of bus bars configured to electrically connect adjacent battery cells of the battery module. The bus bars have voltage sensors associated therewith. The carrier assembly includes a connector assembly coupled to the tray. The connector assembly has a connector including a plurality of terminals configured to be mated with a control module connector associated with the battery module and a multi-wire planar cable extending from the connector. The multi-wire planar cable has a plurality of wires terminated to corresponding terminals and a common jacket for the plurality of wires. The jacket has grooves between adjacent wires for controlled separation of the wires and surrounding jacket portions at a sensor end of the multi-wire planar cable to define separated planar cable segments. The separated planar cable segments are routed within the tray to different areas of the tray for termination to different voltage sensors associated with corresponding bus bars.

In another embodiment, a battery system is provided including a plurality of battery cells forming a battery module and a carrier assembly mounted to the battery module. The carrier assembly has a tray holding a plurality of bus bars for electrically connecting adjacent battery cells of the battery module. The bus bars have voltage sensors sensing a voltage of the corresponding bus bar. The battery system including a connector assembly coupled to the tray. The connector assembly has a connector including a plurality of terminals configured to be mated with a control module connector associated with the battery module and a multi-wire planar cable extending from the connector. The multi-wire planar cable has a plurality of wires terminated to corresponding terminals and a common jacket for the plurality of wires. The jacket has grooves between adjacent wires for controlled separation of the wires and surrounding jacket portions at a sensor end of the multi-wire planar cable to define separated planar cable segments. The separated planar cable segments are routed within the tray to different areas of the tray for termination to different voltage sensors associated with corresponding bus bars.

DETAILED DESCRIPTION OF THE INVENTION

Figure 1:
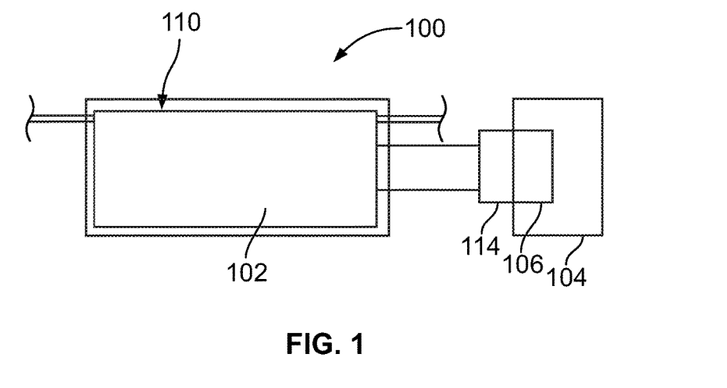
FIG. 1 is a top perspective view of a battery system formed in accordance with an exemplary embodiment.

FIG. 1 is a top perspective view of a battery system 100 formed in accordance with an exemplary embodiment. The battery system 100 includes one or more battery modules 102 with corresponding carrier assemblies 110 mounted to the battery module(s) 102. The battery modules 102 may be stacked together as a battery pack used as part of the battery system 100, such as a battery system in a vehicle, such as an electric vehicle or a hybrid electrical vehicle. The battery system 100 may be used in other applications in alternative embodiments. The battery modules 102 may be contained within a housing.

The battery system 100 includes a battery control module 104, which may be mounted to the battery module(s) 102. The battery control module 104 controls activities of the battery modules 102. The battery control module 104 may include or communicate with a vehicle system controller to verify that the battery module 102 is operating within the parameters set for the current condition of the battery module 102. The battery control module 104 may monitor the voltage of the cells of the battery module 102. The battery control module 104 may monitor the temperature of the battery module 102. The battery control module 104 may supply fault codes to the vehicle.

The battery system 100 includes one or more connector assemblies 114 coupled to the battery control module 104, such as to corresponding control module connectors 106 of the battery control module 104. The connector assemblies 114 are electrically coupled to voltage sensors, temperature sensors and the like within the battery module 102 and routed to the battery control module 104.

Figure 2:
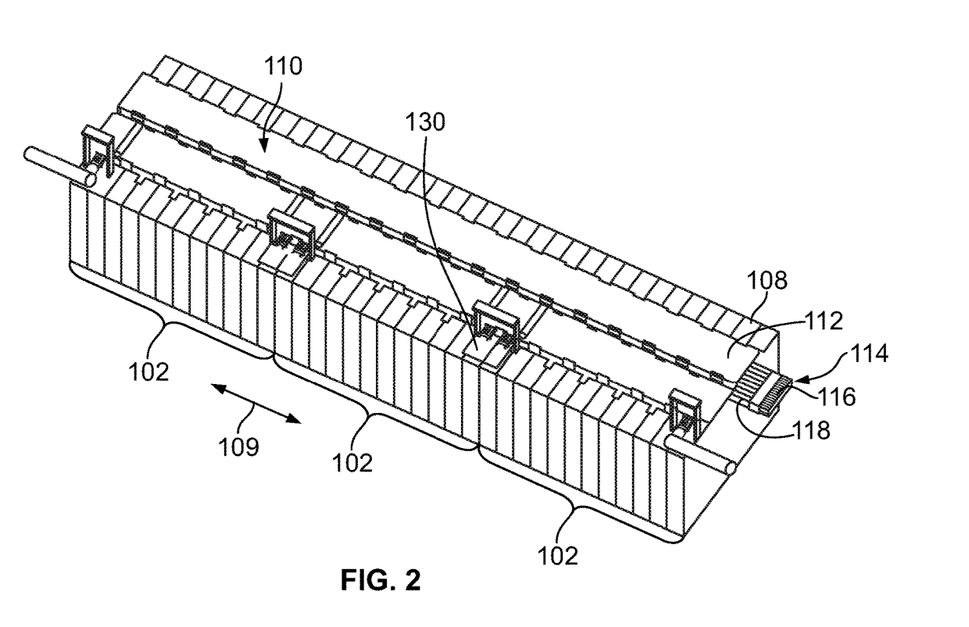
FIG. 2 is a top perspective view of a battery module of the battery system.

FIG. 2 is a top perspective view of one of the battery modules 102. The battery module 102 includes a plurality of battery cells 108, such as prismatic battery cells. The battery cells 108 are arranged in a stacked configuration, side-by-side, to form the battery module 102. Optional, the battery module 102 may include a case or other housing that holds the battery cells 108. A battery cover may be provided over the tops of the battery cells 108. The battery cover may cover each of the battery cells 108.

Each battery module 102 includes a positive battery terminal and a negative battery terminal. The battery terminals are configured to be coupled to external power cables or alternatively may be bussed to battery terminals of another battery module 102. Optionally, the battery terminals may be connected using quick-connection types of connectors.

The carrier assembly 110 is provided over the battery module 102. The carrier assembly 110 holds the one or more connector assemblies 114. The carrier assembly 110 includes one or more trays 112 holding a plurality of bus bars 130 (shown in FIG. 4). The bus bars 130 have voltage sensors associated therewith. The connector assembly 114 is electrically connected to corresponding voltage sensors for monitoring the bus bars 130 and the battery cells 108.

The connector assembly 114 includes a connector 116 and a multi-wire planar cable 118 terminated to corresponding terminals held in the connector 116. The connector 116 is configured to be mated with the corresponding control module connector 106 (shown in FIG. 1) of the battery control module 104 (shown in FIG. 1). The connector assembly 114 IS electrically connected to the bus bars 130 to monitor the voltage of the corresponding battery cells 108 of the battery module 102 by measuring the voltage across the bus bar 130 between the associated battery cells 108. For example, the plurality of wires of the cable 118 may be electrically connected to corresponding bus bars 130.

Figures 3, 4, 5:
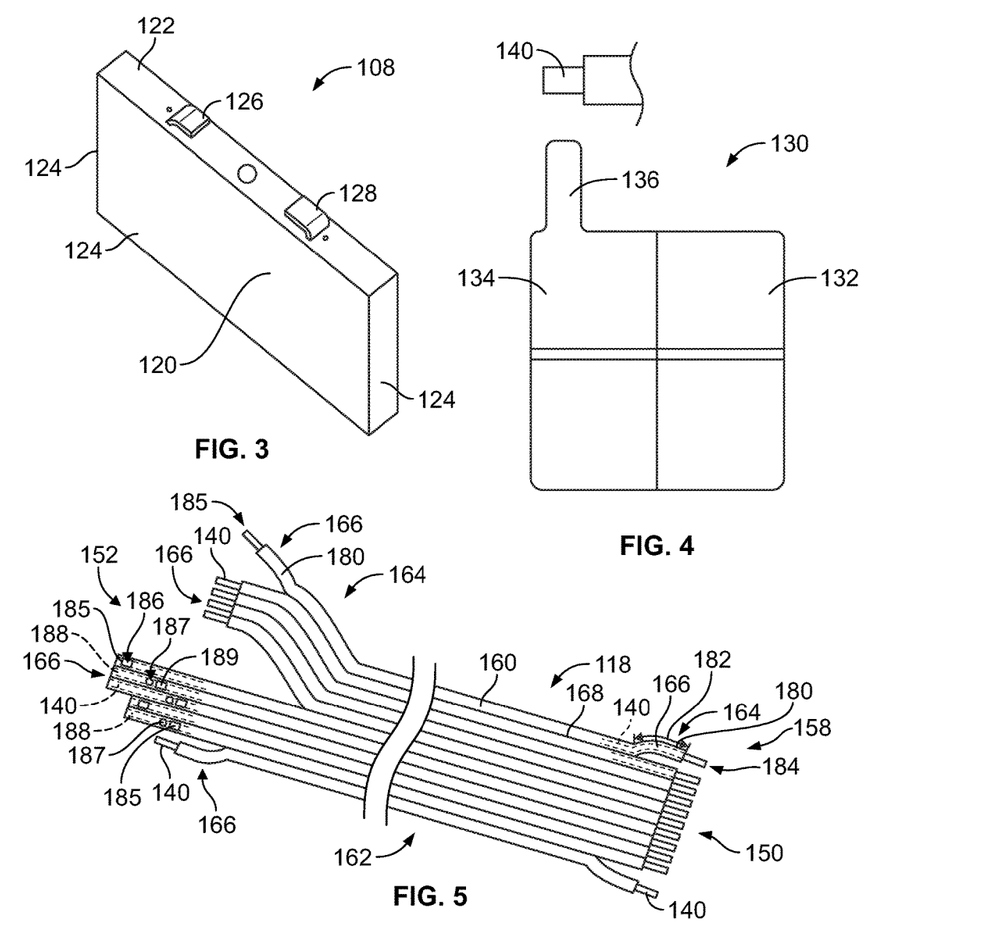
FIG. 3 is a top perspective view of a battery cell of the battery module formed in accordance with exemplary embodiment.
FIG. 4 is a top perspective view of a bus bar of the battery module formed in accordance with an exemplary embodiment.
FIG. 5 is a top view of a multi-wire planar cable in accordance with an exemplary embodiment.

FIG. 3 is a top perspective view of one of the battery cells 108 formed in accordance with exemplary embodiment. The battery cell 108 includes a cell housing 120 having a top 122 and side walls 124. In the illustrated embodiment, the cell housing 120 is boxed shaped having four side walls 124.

The battery cell 108 includes a positive cell terminal 126 and a negative cell terminal 128. In the illustrated embodiment, the terminals 126, 128 include flat pads having upper surfaces that define connection interfaces for electrical connection to corresponding bus bars 130 (shown in FIG. 4).

FIG. 4 is a top perspective view of one of the bus bars 130 formed in accordance with an exemplary embodiment. The bus bar 130 is used to electrically connect the cell terminals 126 or 128 (shown in FIG. 3) of adjacent battery cells 108 (shown in FIG. 2).

The bus bar 130 includes a positive plate 132 and a negative plate 134. The positive plate 132 is configured to be terminated to a corresponding positive cell terminal 126 of one battery cell 108 and the negative plate 134 is configured to be terminated to a corresponding negative cell terminal 128 of the adjacent battery cell 108.

The bus bar 130 includes a voltage sensor 136. The voltage sensor 136 may extend from one of the plates, such as from the negative plate 134. The voltage sensor 136 may be defined by one of the plates 132, 134. For example, the voltage sensor 136 may be a portion or surface of one of the plates 132, 134. In the illustrated embodiment, the voltage sensor 136 constitutes a weld tab configured to receive a wire 140 of the connector assembly 114 (shown in FIG. 1). Welding provides a reliable connection with the wire 140 for accurate, reliable sensing. Other types of voltage sensors may be provided in alternative embodiments to connect to a corresponding component of the connector assembly 114, such as a crimp barrel, an insulation displacement contact, a spring contact, a pin, a socket, a poke-in wire connection, and the like. The wire 140 may be affixed to the bus bar 130, such as be crimping, welding, soldering, using conductive adhesive, and the like in other alternative embodiments. Optionally, the voltage sensor 136 may be stamped and formed with the bus bar 130. In alternative embodiments, the voltage sensor 136 may be a separate component coupled to the bus bar 130, such as by being soldered, welded, fastened or otherwise secured to the bus bar 130.

Figure 6:
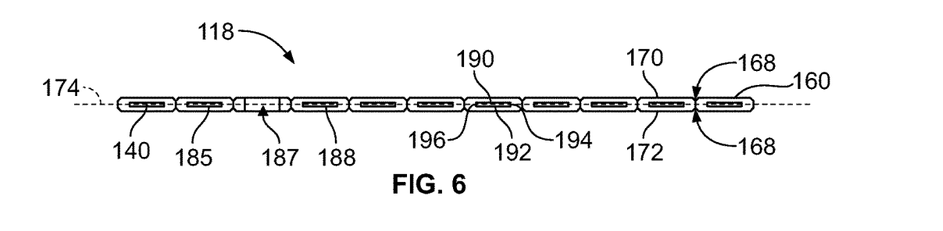
FIG. 6 is a cross-sectional view of the multi-wire planar cable.

FIG. 5 is a top view of an end 158 of the multi-wire planar cable 118 in accordance with an exemplary embodiment. FIG. 6 is a cross-sectional view of the cable 118. The cable 118 extends between a connector end 150 and a sensor end 152. The wires 140 at the connector end 150 are configured to be terminated to corresponding terminals of the connector 116 (shown in FIG. 2). The wires 140 at the sensor end 152 are configured to be terminated to corresponding voltage sensors 136 (shown in FIG. 4).

The cable 118 has a plurality of the wires 140 and a common jacket 160 for the plurality of wires 140. The wires 140 are metal conductors. Optionally, the wires 140 may be flat wires having a rectangular cross-section. However, other types of wires may be provided in alternative embodiments, such as non-flat wires, rounded wires, and the like. In an exemplary embodiment, the cable 118 is flat or planar. The cable 118 is flexible. The cable 118 has the wires 140 arranged in a stacked arrangement with the wires 140 side-by-side. Each of the wires 140 are connected together as a unit by the common jacket 160 in a ribbon portion 162 (FIG. 5) of the cable 118.

The connector end 150 and/or the sensor end 152 of the cable 118 may have one or more of the wires 140 separated from each other for a length at a separation region 164 (FIG. 5) of the cable 118 (any or all of the wires 140 may be separated from each other at the separation region 164). For example, the separated portions may be torn or cut to separate portions of the wires 140. The separated portions may be referred to as separated planar cable segments 166 of the cable 118. Each separated planar cable segment 166 has one or more of the wires 140 and the corresponding portion of the material of the jacket 160. The separated planar cable segments 166 extend from the ribbon portion 162 of the cable 118, where the wires 140 remain intact and coupled together as a unit. The separated planar cable segments 166 are independently movable relative to each other, such as for termination to the terminals and/or for independent loading into the connector 116. Each separated planar cable segment 166 includes at least one wire 140 and corresponding jacket portion. Optionally, the separated planar cable segments 166 may have multiple wires 140 and associated jacket portions with such jacket portions remaining intact and coupled together as a unit to the distal end of the cable 118. Optionally, the separated planar cable segments 166 may have a ribbon segment along a portion thereof where the separated planar cable segment 166 is separated from other segment(s) 166 but where the jacket portions of the particular separated planar cable segment are not separated from each other, and then where one or more of the wires 140 may be separated downstream of the ribbon segment to the distal end.

In an exemplary embodiment, the separated planar cable segments 166 are separated at grooves 168 in the jacket 160. The grooves 168 may be centered between adjacent wires 140. The grooves 168 may be V-shaped to force separation at the point of the groove 168, such as along the bisector line between the grooves 168. The grooves 168 define boundaries between the wires 140 and force separation to occur along the grooves 168. Without the grooves, tearing or cutting may wander away from one wire 140 and toward another wire 140 leading to some wires 140 have more jacketing material and other wires 140 having less jacketing material. Without controlled separation, portions of the wires 140 may be exposed by the tearing or cutting.

The jacket 160 is insulative and made from a dielectric material, such as polyurethane, polyvinylchloride, chlorinated polyethylene, thermoplastic elastomer, rubber, and the like. The jacket 160 has a top surface 170 and a bottom surface 172 opposite the top surface 170. The top and bottom surfaces 170, 172 are generally planar. A cable plane 174 (FIG. 6) of the cable 118 is defined between the top and bottom surfaces 170, 172. The jacket 160 has a thickness between the top and bottom surfaces 170, 172. The thickness is relatively small compared to a length and a width of the cable 118. The thickness may be reduced at the grooves 168. For example, the thickness may be reduced by approximately 10%, by approximately 30%, by approximately 50%, or more at the grooves 168. Optionally, the grooves 168 may be provided on both the top surface 170 and the bottom surface 172; however the grooves 168 may be provided on only the top surface 170 or the bottom surface 172 in alternative embodiments. The grooves 168 may be aligned with each other across the cable 118 in an exemplary embodiment.

At the separation region 164, the separated planar cable segments 166 have jacket portions 180 surrounding the wires 140 that define insulating sleeves and may be referred to hereinafter as insulating sleeves 180. The insulating sleeves 180 extend a length of the wires 140 to the ribbon portion 162. In an exemplary embodiment, terminating portions 184, 185 of the wires 140 may be exposed beyond the insulating sleeves 180 at distal ends of the wires 140 for termination to the terminals of the connector 116 or to the voltage sensor 136, respectively (for example, shown at the connector end 150 and on the top half of the wires 140 at the sensor end 152). The terminating portion 185 is configured to be electrically connected to the bus bar 130 by the corresponding voltage sensor 136.

Alternatively, rather than exposing the terminating portions 184, 185 beyond the insulating sleeves 180, the terminating portions 184, 185 may be exposed through the insulating sleeve 180, such as from the top surface 170 and/or the bottom surface 172. For example, a portion of the jacket 160 may be removed to define a window 186 exposing the wire 140. The exposed portion of the wire 140 may be electrically connected to the terminal or the voltage sensor 136. In an exemplary embodiment, the wires 140 include punch-out portions 187 and dead portions 188 downstream of the terminating portions 185. The punch-out portions 187 are formed by punching through the cable 118 to remove a length of the wire 140. The punch-out portion 187 defines a discontinuity along the wire 140 such that the corresponding dead portion 188 is no longer electrically connected to the corresponding terminating portion 185. The electrical signal on the wire 140 is only able to be transmitted upstream of the punch-out portion 187 to the connector end 150 and is unable to be transmitted along the dead portion 188, which may reduce the risk of cross-talk or interference with other adjacent wires 140. FIG. 6 illustrates a terminating portion 185, a punch-out portion 187 and a dead portion 188 in cross-section for reference. The exposed terminating portions 185 define take-out points 189 for the wires 140 where the electrical signals are transferred to the wires 140. The take-out points 189 may be at the distal ends of the wires 140 or may be upstream from the distal ends, such as at the terminating portions 185 upstream of the punch-out portions 187.

In other various embodiments, the wire 140 may be electrically connected to the terminal or the voltage sensor 136 by the terminal or the voltage sensor 136 piercing the jacket 160. For example, the terminal or voltage sensor 136 may be terminated by a pierce crimp. The point of the pierce crimp defines the take-out point 189 for the particular wire 140.

The wires 140 have an upper flat side 190, a lower flat side 192 and opposite first and second edges 194, 196 between the flat sides 190, 192. In an exemplary embodiment, the insulating sleeves 180 surround the sides 190, 192 and the edges 194, 196 to ensure that no portion of the wires 140 are exposed, which could lead to a short circuit or arcing.

Figure 7:
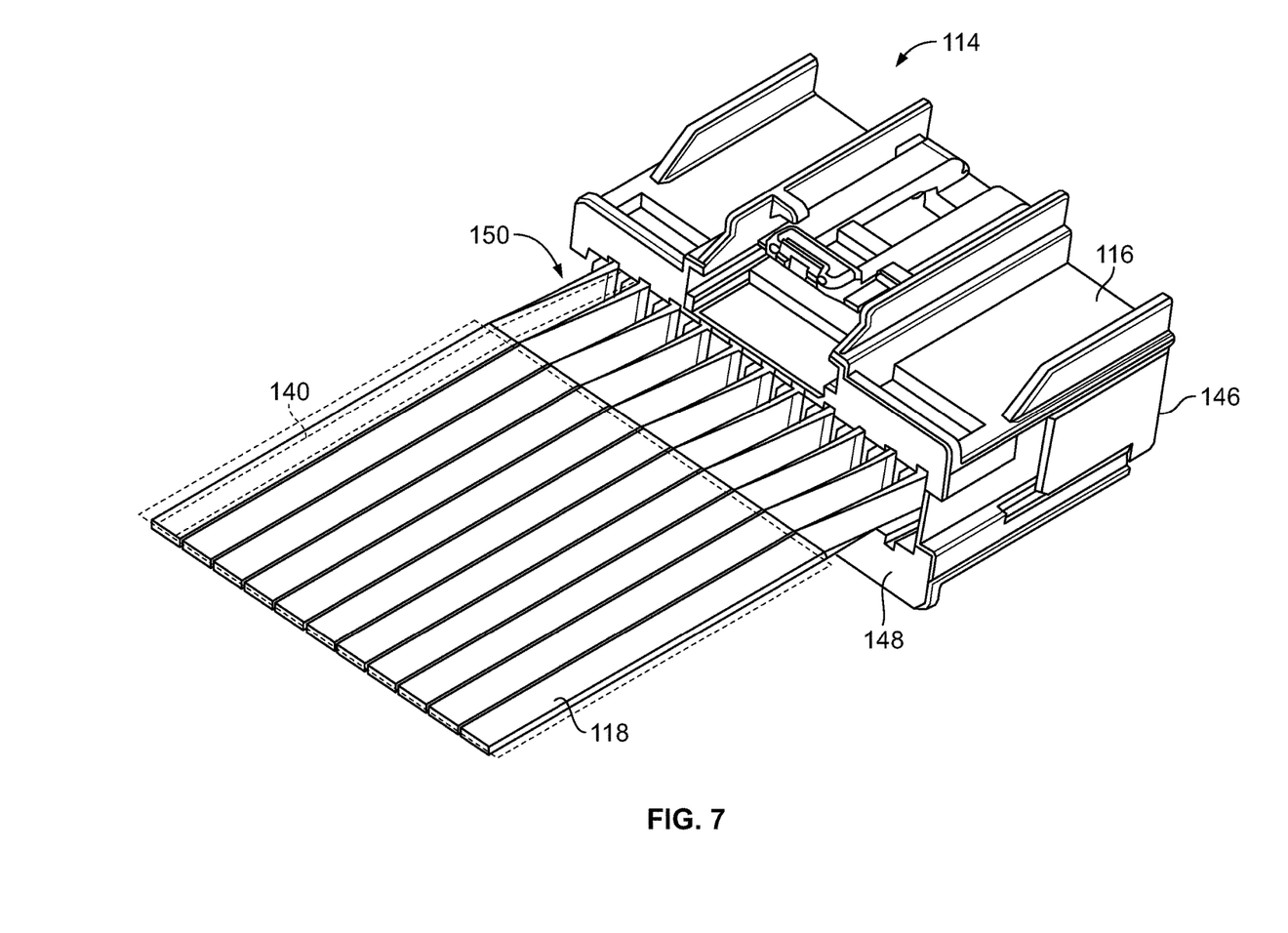
FIG. 7 is a perspective view of a portion of a connector assembly of the battery system.

FIG. 7 is a perspective view of a portion of the connector assembly 114. The connector assembly 114 includes the connector 116 provided at the connector end 150 of the multi-wire planar cable 118. The cable 118 includes a plurality of the wires 140, which are connected to corresponding voltage sensors 136 (shown in FIG. 4) and to corresponding terminals of the connector 116.

The connector 116 includes a housing 144 holding the terminals (not shown). The housing 144 extends between a front 146 and a rear 148. The front 146 defines a mating end of the connector 116 configured for mating with the control module connector 106 (shown in FIG. 1).

Figure 8:
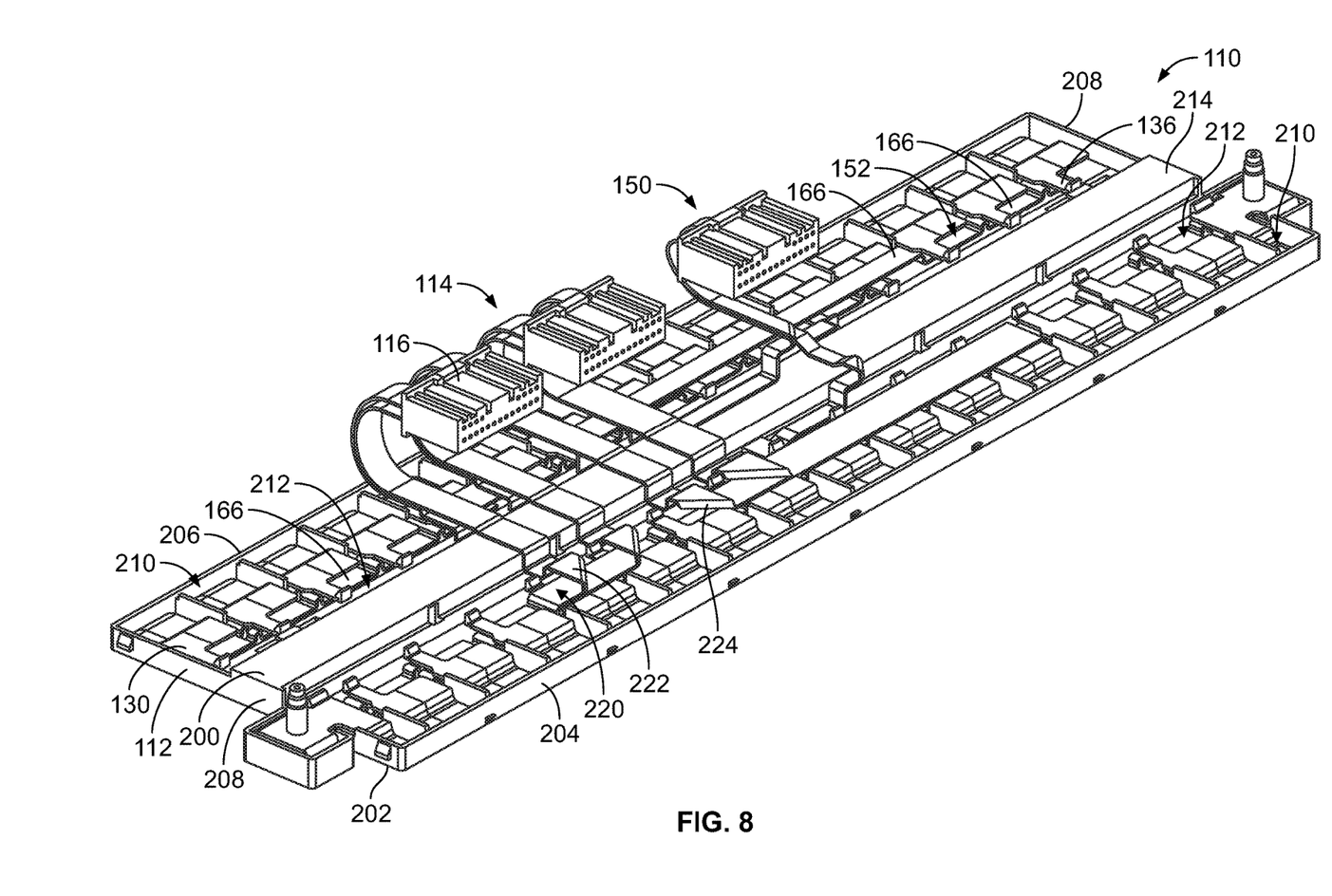
FIG. 8 is a front perspective view of a carrier assembly of the battery system including a plurality of the connector assemblies.
Figure 9:
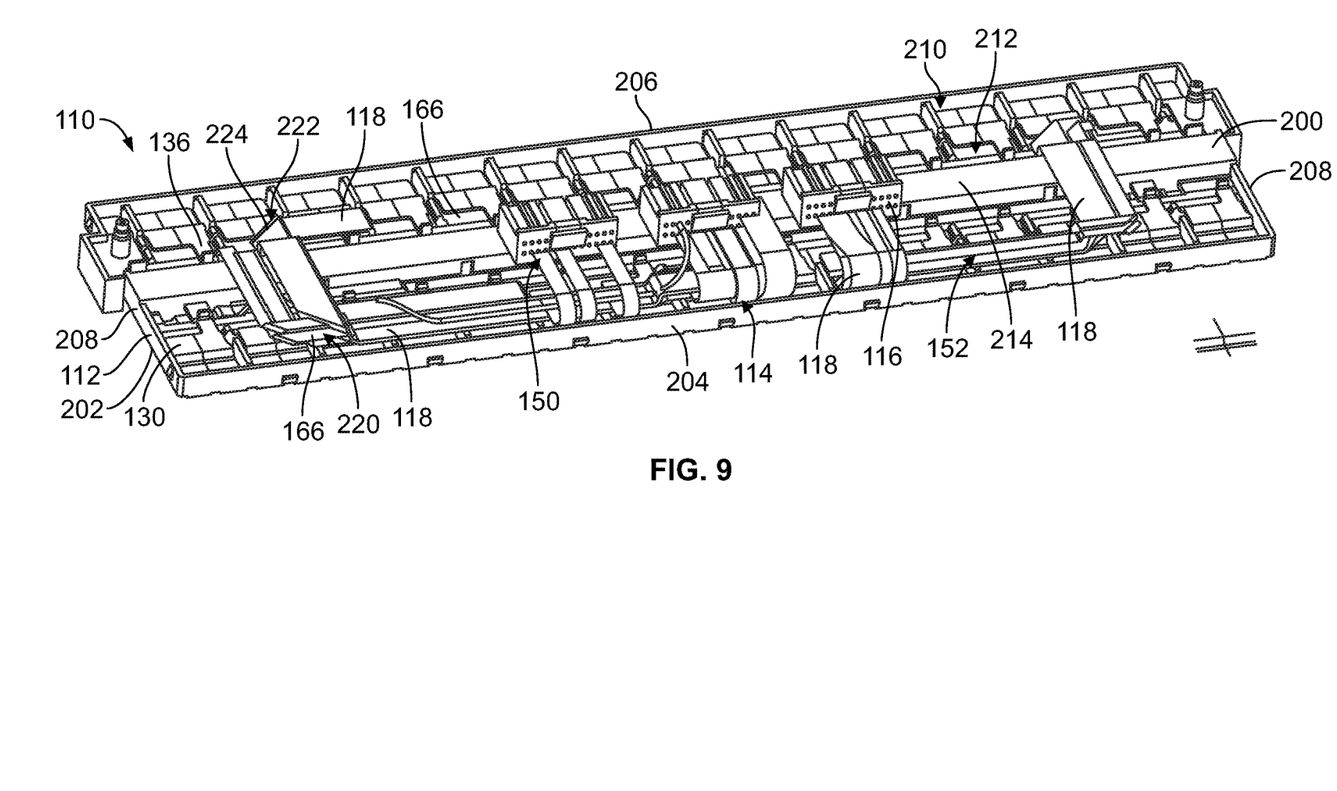
FIG. 9 is a rear perspective view of the carrier assembly and the connector assemblies.
Figure 10:
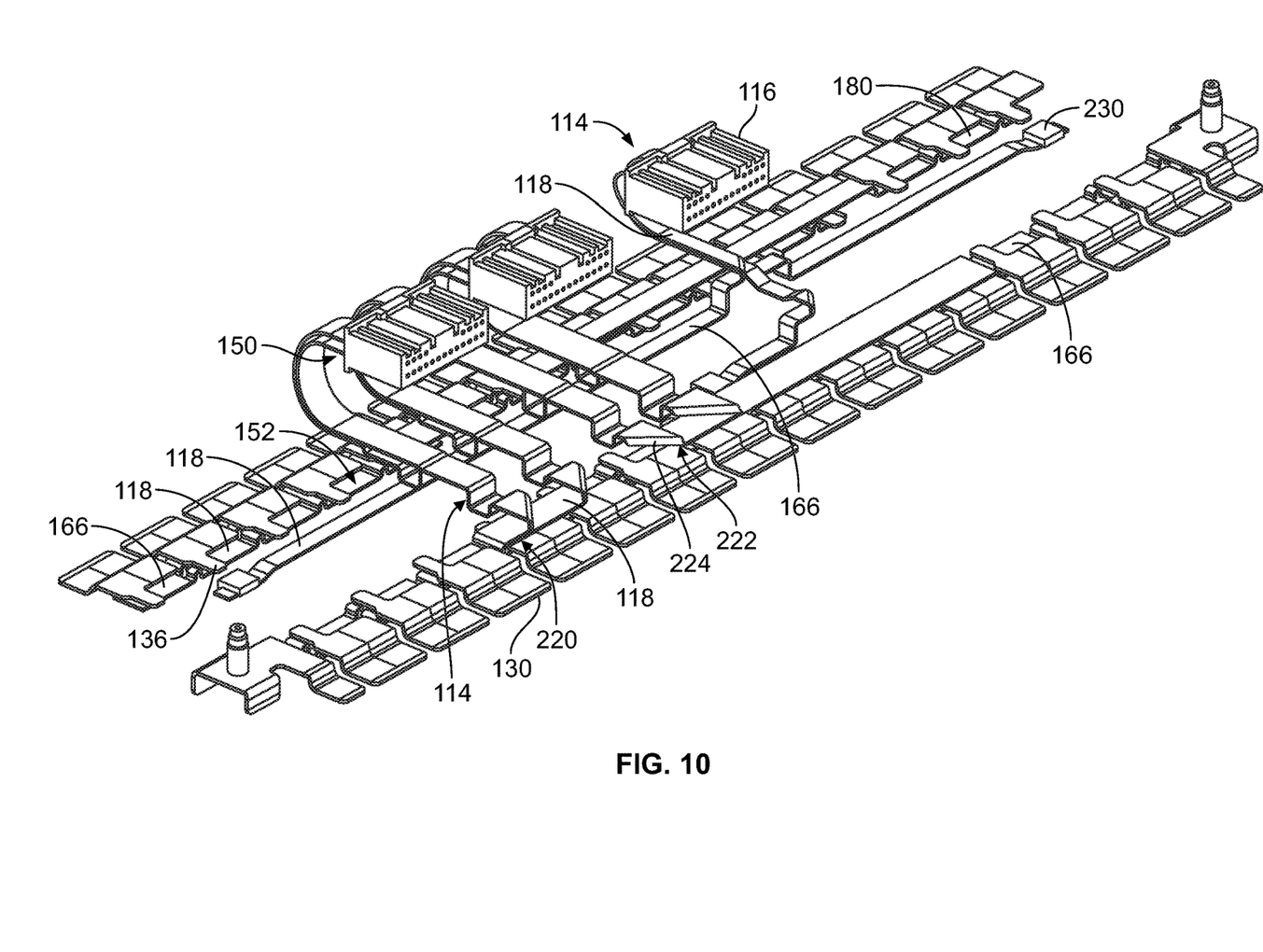
FIG. 10 illustrates a portion of the carrier assembly.

FIG. 8 is a front perspective view of the carrier assembly 110 including a plurality of the connector assemblies 114. FIG. 9 is a rear perspective view of the carrier assembly 110 including a plurality of the connector assemblies 114. FIG. 10 illustrates a portion of the carrier assembly 110, showing the connector assemblies 114 and the bus bars 130 with the tray 112 removed for clarity.

The carrier assembly 110 includes the tray 112 holding the bus bars 130. The tray 112 includes a top 200 and a bottom 202. The bottom 202 is configured to be mounted to the battery module 102. The tray 112 includes a front 204 and a rear 206 with sides 208 therebetween. A cover (shown in FIG. 2) may be coupled to the tray 112 at the top 200, such as being coupled to the front 204, the rear 206 and/or the sides 208.

The tray 112 includes pockets 210 receiving corresponding bus bars 130. Optionally, the pockets 210 may be positioned generally along the front 204 and the rear 206. The tray 112 includes channels 212 extending between various pockets 210. The cables 118 may be routed in the channels 212 to interface with the corresponding bus bars 130. In an exemplary embodiment, the tray 112 includes a central beam 214 extending between the sides 208 and being approximately centered between the front 204 and the rear 206. The channels 212 may be provided on opposing sides of the central beam 214 between the central beam 214 and the pockets 210. The channels 212 may be provided on top of the pockets 210. The cables 118 may extend between the channels 212 across the central beam 214.

In an exemplary embodiment, the sensor ends 152 of the cables 118 are separated into the various separated planar cable segments 166 and routed to different areas of the tray 112 for termination to different voltage sensors 136 associated with corresponding bus bars 130. Optionally, the separated planar cable segments 166 may have different lengths to extend to the different areas for termination to different voltage sensors 136. The separated planar cable segments 166 are branched in multiple directions including in opposite directions.

In an exemplary embodiment, the connectors 116 and connector ends 150 of the cables 118 are generally centrally located between the opposite sides 208 of the tray 112. The separated planar cable segments 166 may then be branched outward from the center toward the sides 208. The separated planar cable segments 166 may be branched to extend across the central beam 214 from one channel 212 to another channel 212.

Various separated planar cable segments 166 may include a single wire 140 (shown in FIG. 5) and associated surrounding jacket portion 180. Other separated planar cable segments 166 may include multiple wires 140 and associated surrounding jacket portions 180, which extend in a different direction than other separated planar cable segments 166 of the same cable 118.

In an exemplary embodiment, the cables 118 may be stacked in a cable stack 220 to route the cables 118 to the various areas of the tray 112. Some cables 118 may be stacked on other cables 118. Some cables 118 may be stacked on themselves. For example, the cables 118 may be folded over at a folded section 222 to change a routing direction of the multi-wire planar cable 118. For example, the folded section 222 of the cable 118 may allow the cable to be turned approximately 90° to route from one channel 212 to the other channel 212. The wires 140 overlap each other in the folded section 222. The folded section 222 includes a folded edge 224, which may be oriented at approximately a 45° angle to achieve an approximate 90° change in routing direction of the cable 118. The wires 140 are generally co-planar along any particular section of the separated planar cable segments 166. For example, upstream of the folded section 222 the wires 140 of a particular cable 118 are generally co-planar and downstream of the folded section 222 the wires 140 of a particular cable 118 are generally co-planar. However, at the folded section 222, such as at the folded edge 224, the wires transition.

Optionally, some cables 118 may be routed to similar areas and are thus routed within the cable stack 220 to a common area and then branched in appropriate directions for termination to targeted voltage sensors 136 or another sensor, such as a temperature sensor 230. Optionally, the separated planar cable segments 166 of a particular cable 118 (for example, a first cable 118) may be stacked with the separated planar cable segments 166 of a different cable 118 (for example, a second cable 118), while other separated planar cable segments 166 of the first cable 118 may be routed in a different cable stack 220 with separated planar cable segments 166 of another cable 118 (for example, the second cable 118 or a third cable 118). Portions of the separated planar cable segments 166 (for example, the portions closest to the sensor ends 152) branch out from the cable stack 220 and are routed to different areas of the tray 112 for termination to different voltage sensors 136 than portions of the separated planar cable segments 166 of the other multi-wire planar cable(s) 118.

Figure 11:
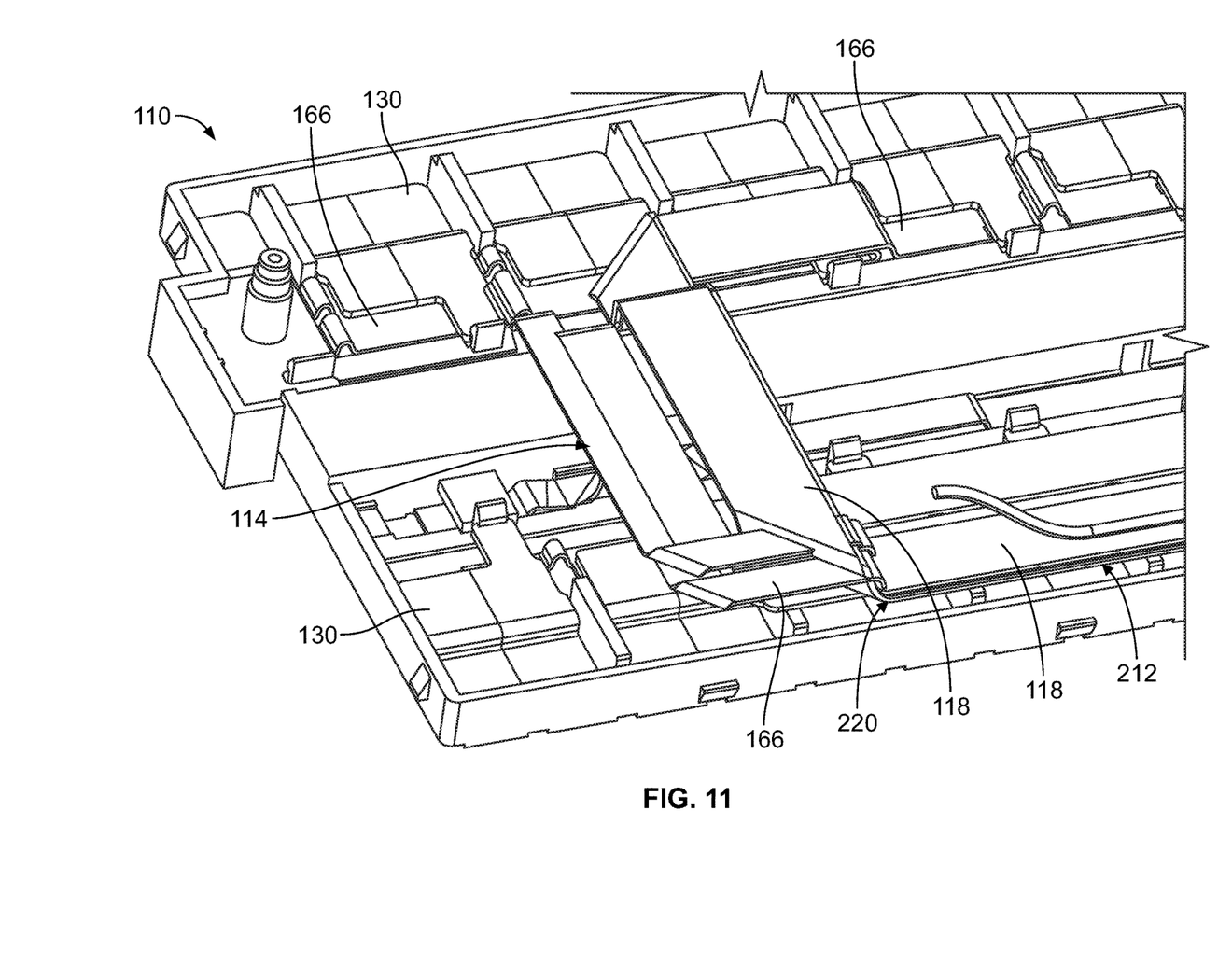
FIG. 11 illustrates a portion of the carrier assembly.
Figure 12:
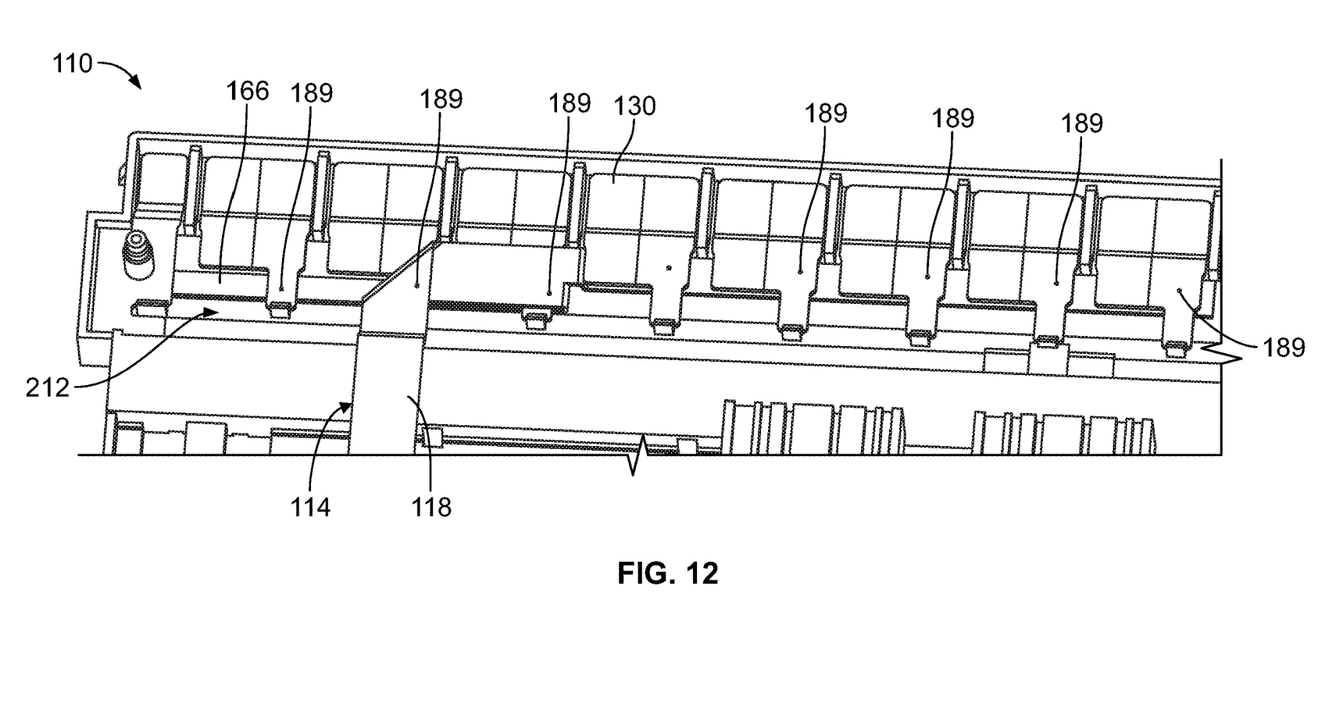
FIG. 12 illustrates a portion of the carrier assembly.

FIG. 11 illustrates a portion of the carrier assembly 110 showing cables 118 of the connector assemblies 114. FIG. 12 illustrates a portion of the carrier assembly 110 showing one of the cables 118 of one of the connector assemblies 114. FIG. 11 shows the cable stack 220 showing multiple cables 118 stacked on top of each other within the channels 212. FIGS. 11 and 12 show the separated planar cable segments 166 extending in different directions to corresponding bus bars 130. FIG. 12 illustrates a plurality of take-out points 189 where the separated planar cable segments 166 intersect with the bus bars 130. Optionally, each separated planar cable segment 166 may include multiple take-out points 189, one for each wire 140 (shown in FIG. 5).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly for voltage monitoring of bus bars electrically connecting adjacent battery cells of a battery module, the connector assembly comprising:

a connector having terminals for mating with a control module connector associated with the battery module;

a multi-wire planar cable extending from the connector, the multi-wire planar cable having flat wires terminated to the terminals and a common jacket for the flat wires, the common jacket including a top surface and a bottom surface, at least one of the top surface or the bottom surface being planar, the common jacket having grooves in at least one of the top surface or the bottom surface between adjacent flat wires for controlled separation of the flat wires and surrounding common jacket portions at a sensor end of the multi-wire planar cable to define separated planar cable segments, the separated planar cable segments being routed to different areas for termination to different voltage sensors associated with the bus bars.

2. The connector assembly of claim 1, wherein the separated planar cable segments are branched in multiple directions.

3. The connector assembly of claim 1, wherein the separated planar cable segments extend in opposite directions.

4. The connector assembly of claim 1, wherein at least one of the separated planar cable segments includes a single flat wire and associated surrounding common jacket portion.

5. The connector assembly of claim 1, wherein at least one of the separated planar cable segments includes multiple flat wires and associated surrounding common jacket portions.

6. The connector assembly of claim 1, wherein the flat wires include exposed terminating portions at take-out points from the separated planar cable segment.

7. The connector assembly of claim 6, wherein each separated planar cable segment includes multiple take-out points.

8. The connector assembly of claim 1, wherein the separated planar cable segments have different lengths to extend to the different areas for termination to different voltage sensors.

9. The connector assembly of claim 1, wherein the flat wires include terminating portions configured to be electrically connected to the bus bars.

10. The connector assembly of claim 9, wherein the flat wires include punch-out portions and dead portions downstream of the terminating portions, the punch-out portions defining a discontinuity along the flat wires such that the dead portions are no longer electrically connected to the terminating portions.

11. The connector assembly of claim 9, wherein the terminating portions are provided at distal ends of the flat wires.

12. The connector assembly of claim 1, wherein the multi-wire planar cable is a first multi-wire planar cable, the connector assembly further comprising a second multi-wire planar cable extending from the connector having second wires terminated to the terminals, the second wires being flat, the second multi-wire planar cable having a common second jacket for the second wires, the second common jacket including a second top surface and a second bottom surface, at least one of the second top surface or the second bottom surface being planar, the second common jacket having second grooves in at least one of the second top surface or the second bottom surface between adjacent second wires for controlled separation of the second wires and surrounding second jacket portions at a second sensor end of the second multi-wire planar cable to define second separated planar cable segments of the second multi-wire planar cable, the second separated planar cable segments being routed to different areas for termination to different voltage sensors associated with the bus bars, the second separated planar cable segments of the first and second multi-wire planar cables being stacked in a cable stack for portions of lengths thereof, portions of the separated planar cable segments of the first multi-wire planar cable being routed to different areas for termination to different voltage sensors than portions of the second separated planar cable segments of the second multi-wire planar cable.

13. The connector assembly of claim 1, wherein the flat wires are generally co-planar along any particular section of the separated planar cable segments.

14. The connector assembly of claim 1, wherein the multi-wire planar cable includes a folded section including a folding edge to change a routing direction of the multi-wire planar cable, the flat wires overlapping each other in the folded section.

15. The connector assembly of claim 1, wherein the common jacket having a thickness defined between the top surface and the common bottom surface, the jacket being thinner at the grooves.

16. The connector assembly of claim 1, wherein the grooves are provided along both the top surface and the bottom surface of the common jacket.

17. A carrier assembly for battery cells of a battery module, the carrier assembly comprising:
a tray configured to be coupled to a top of the battery module over the battery cells, the tray holding a plurality of bus bars configured to electrically connect adjacent battery cells of the battery module, the bus bars having voltage sensors associated therewith;
a connector assembly coupled to the tray, the connector assembly having a connector including terminals for mating with a control module connector associated with the battery module and a multi-wire planar cable extending from the connector, the multi-wire planar cable having wires terminated to the terminals and a common jacket for the of wires, the jacket including a top surface and a bottom surface, at least one of the top surface and the bottom surface being planar, the jacket having grooves in at least one of the top surface or the bottom surface between adjacent wires for controlled separation of the wires and surrounding jacket portions at a sensor end of the multi-wire planar cable to define separated planar cable segments, the separated planar cable segments being routed within the tray to different areas of the tray for termination to different voltage sensors associated with the bus bars.

18. The carrier assembly of claim 17, wherein the separated planar cable segments are branched in multiple directions.

19. The carrier assembly of claim 17, wherein the multi-wire planar cable is a first multi-wire planar cable, the connector assembly further comprising a second multi-wire planar cable extending from the connector having second wires terminated to the terminals, the second wires being flat, the second multi-wire planar cable having a common second jacket for the second wires, the second jacket including a second top surface and a second bottom surface, at least one of the second top surface or the second bottom surface being planar, the second jacket having second grooves in at least one of the second top surface or the second bottom surface between adjacent second wires for controlled separation of the second wires and surrounding second jacket portions at a second sensor end of the second multi-wire planar cable to define second separated planar cable segments of the second multi-wire planar cable, the second separated planar cable segments being routed to different areas for termination to different voltage sensors associated with the bus bars, the second separated planar cable segments of the first and second multi-wire planar cables being stacked in a cable stack for portions of lengths thereof, portions of the separated planar cable segments of the first multi-wire planar cable being routed to different areas for termination to different voltage sensors than portions of the second separated planar cable segments of the second multi-wire planar cable.

20. A battery system comprising:
a plurality of battery cells forming a battery module;
a carrier assembly mounted to the battery module, the carrier assembly having a tray holding a plurality of bus bars for electrically connecting adjacent battery cells of the battery module, the bus bars having voltage sensors sensing voltages of the bus bars; and
a connector assembly coupled to the tray, the connector assembly having a connector including terminals for mating with a control module connector associated with the battery module and a multi-wire planar cable extending from the connector, the multi-wire planar cable having wires terminated to the terminals and a common jacket for the wires, the jacket including a top surface and a bottom surface, at least one of the top surface and the bottom surface being planar, the jacket having grooves in at least one of the top surface or the bottom surface between adjacent wires for controlled separation of the wires and surrounding jacket portions at a sensor end of the multi-wire planar cable to define separated planar cable segments, the separated planar cable segments being routed within the tray to different areas of the tray for termination to different voltage sensors associated with the bus bars.

* * * * *